July 19, 1955 K. MEISENBURG 2,713,217
SUBGRADING MACHINE
Filed Aug. 6, 1948 4 Sheets-Sheet 1

INVENTOR
Karl Meisenburg
by his attys.
Stebbins Blenko Webb

July 19, 1955 K. MEISENBURG 2,713,217
SUBGRADING MACHINE
Filed Aug. 6, 1948 4 Sheets-Sheet 2
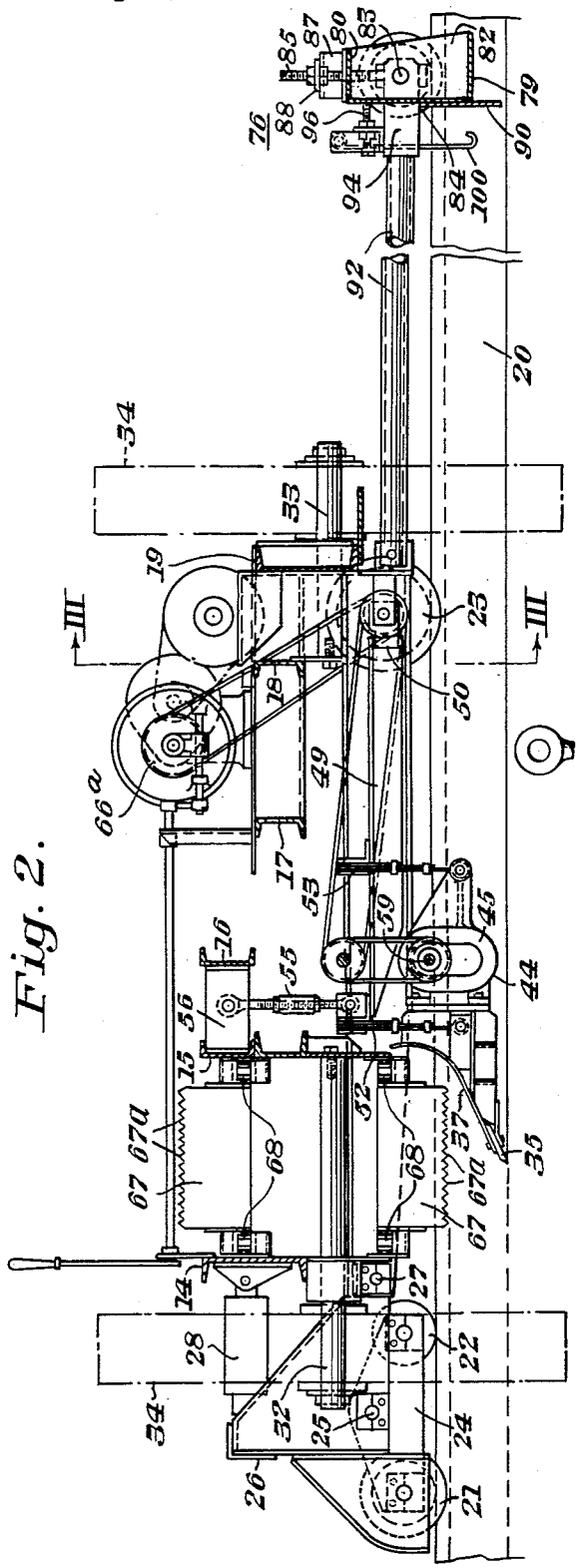
INVENTOR
Karl Meisenburg
by his attys.
Stebbins Blenko + Webb

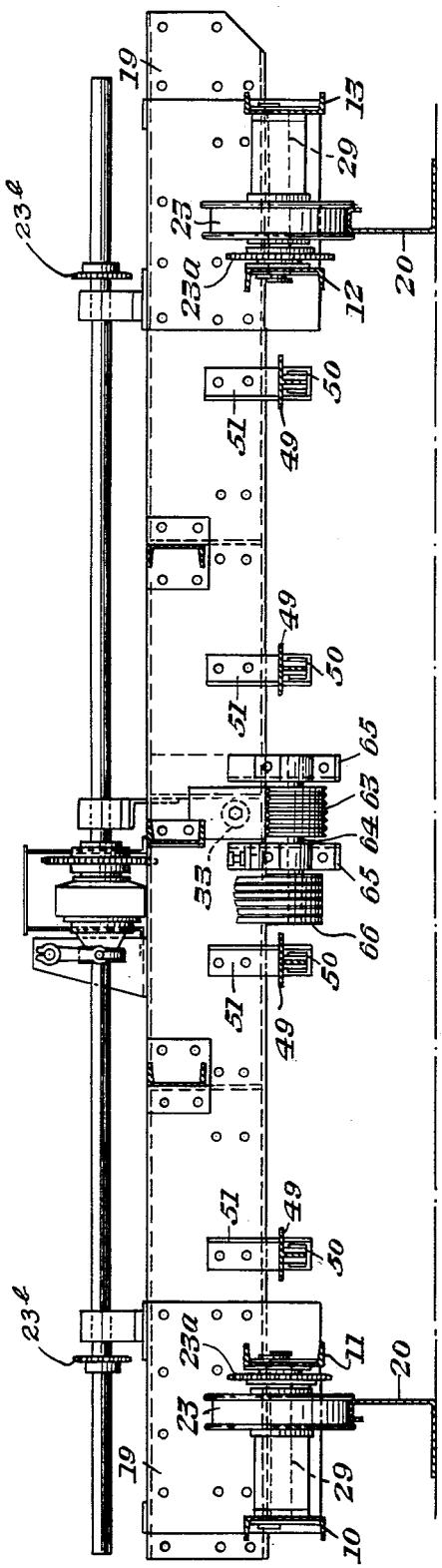

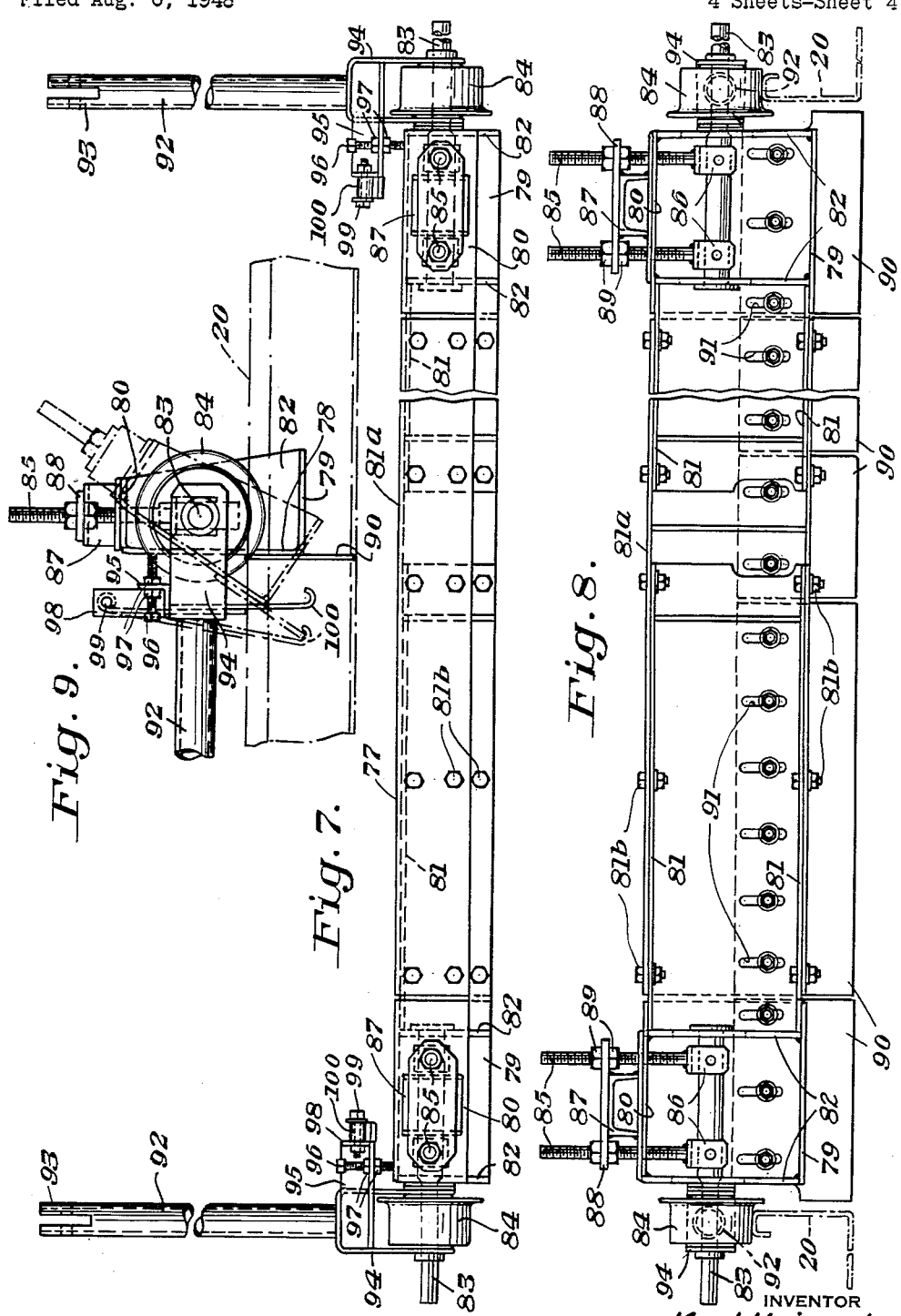

United States Patent Office 2,713,217
Patented July 19, 1955

2,713,217

SUBGRADING MACHINE

Karl Meisenburg, Pittsburgh, Pa., assignor, by mesne assignments, to Blaw-Knox Company, Pittsburgh, Pa., a corporation of Delaware Application August 6, 1948, Serial No. 42,767

4 Claims. (Cl. 37—108)

This application relates to a machine for preparing a smooth earth surface, usually a subgrade, upon which a hard pavement is to be laid. Specifically this application relates to improvements which I have invented in a subgrading machine such as is shown in my Patent No. 2,416,401, issued February 25, 1947.

The subgrading machine described and claimed in my patent is capable of trimming a subgrade to a hard smooth surface and is particularly adaptable for cutting through hard soil. Essentially that subgrader comprises a cutting member which vibrates in a horizontal plane and a flight conveyor which removes the material cut from in front of the cutting member. The material is carried to the side of the machine, it being intended that little if any of the loose material should pass to the rear of the cutting member.

In my improved subgrading machine I provide a cutting member which likewise vibrates in a horizontal plane. The blade of the cutting member which actually does the cutting, however, is in my improved machine supported by a scoop plate which curves rearwardly and upwardly from the blade and in effect constitutes a beam to support the blade. The plate has slots spaced above the blade and across the width of the plate. The slots are of such dimension that a portion of fines from material cut by the blade can be sifted through the scoop plate to the rear of the cutting member. These fines are useful for filling in any uneven spots left by the cutting member and for finally levelling off of the surface prior to rolling.

I also provide a flight conveyor in front of the cutting member which, however, cooperates with the cutting member in a novel manner. The flights of the conveyor have serrations along their outer edges and thus the flights rake the material cut by the cutting member, and thereby assist in passing fines through the slots in the scoop plate, as well as removing all excess material not passed through these slots.

I have improved the structure for supporting the cutting member from the main frame of the subgrading machine. The structure is in the form of subframes each of which comprises a pair of beams hinged at one end to the main frame. The cutting members in turn are suspended from these beams by leaf springs which absorb the horizontal vibrations of the cutting member so that a minimum of vibration is transferred to the main frame. The pin connections of the subframes to the main frame and of the leaf springs to the cutting members include rubber bushings which further dampen and reduce the transmission of such vibrations to the main frame.

I have also designed a strike-off for use with my subgrading machine. It is spaced a substantial distance to the rear of the cutting member so that the subgrade can be inspected after it is cut and prior to the final levelling off by the strike-off. The strike-off receives the fines which pass through the cutting member and spreads them evenly over the surface of the subgrade. The strike-off is readily adjustable so that the depth and contour of the subgrade can be regulated. The strike-off can readily be changed from operative to inoperative position for purposes of moving the machine.

The cutting member can be raised and lowered while the subgrader is in operation. This is also true of the subgrader shown in my patent. However, this operation is particularly significant in my improved subgrader in which fines are passed to the rear of the cutting member and leveled off by a strike-off. In operation, the strike-off is adjusted to the desired grade before rolling, which is somewhat higher than the elevation of the cutting edge of the cutting member. This latter elevation is varied by the operator to establish such clearance between the strike-off and the cut subgrade as will use up all the fines sifted behind the cutting members, and prevent both the accumulation of too much fines ahead of the strike-off and the lack of sufficient fines.

In the accompanying drawings I have illustrated a present preferred embodiment of my invention in which Figure 1 is a front elevation of my subgrading machine.

Figure 2 is a longitudinal section along the lines II—II of Figure 1.

Figure 3 is a transverse section along the lines III—III of Figure 2.

Figure 4 is an end view of the cutting member and a portion of its supporting subframe.

Figure 6 is a section along the lines VI—VI of Figure 5.

Figure 7 is a plan view of a strike-off which forms part of my subgrading machine.

Figure 8 is a rear view of the strike-off shown in Figure 7.

Figure 9 is a left-hand end view viewing Figure 8.

Figure 1:
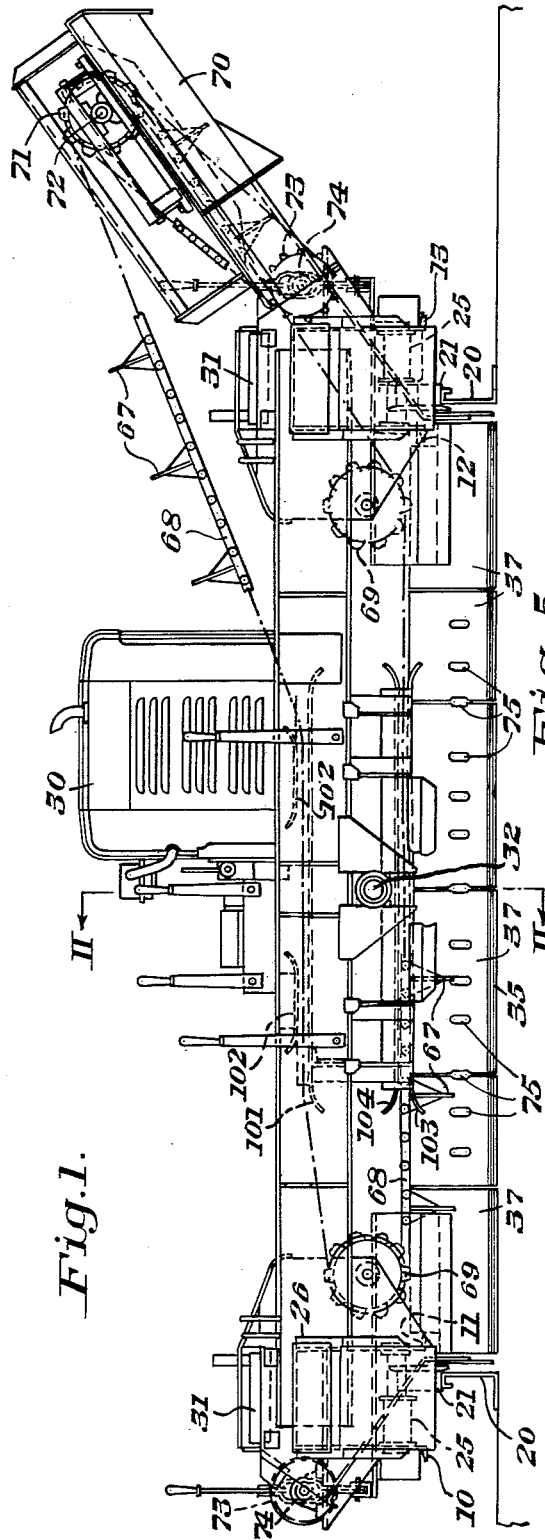

A subgrading machine constructed in accordance with my invention comprises a generally rectangular frame having longitudinal members 10, 11, 12 and 13 and transverse members 14, 15, 16, 17, 18 and 19. The frame is designed to travel along spaced supports such as road forms 20 and for that purpose has front wheels 21 and 22 and rear wheels 23. The front wheels 21 and 22 are mounted in trucks 24 which in turn are journaled on axles 25 carried by boxes 26 having the general shape of right triangles and formed of plates. The rear corners of the boxes 26 are pivoted about axles 27 journaled in bearings supported from the transverse beam or member 14. Hydraulic jacks 28 pivotally mounted on the transverse member 14 tilt the boxes 26 about the axles 27 to raise and lower the front of the entire subgrading machine. Such raising or lowering moves the cutting member bodily and regulates the depth of cut. The rear wheels 23 are mounted on short axles 29 journaled in the longitudinal members 10, 11 on one side of the subgrading machine and 12, 13 on the other side.

The subgrading machine has an internal combustion engine 30 which supplies power for moving the machine along the road forms 20 and also for operating various other moving parts hereinafter described.

The machine is moved forwardly to trim a subgrade in the same manner as the grading machine shown in my patent, i. e., by cables one end of each of which are secured to the road form in advance of the machine and the other ends of which pass over guide rolls 31 to conventional cable drums driven by the motor 30. The cable drums, the driving connections to the engine 30 and controls therefor can be the same as shown in my Patent No. 2,416,401. When a subgrade is not being trimmed the machine can be moved along the road forms 20 by driving the rear wheels 23 through a chain and sprocket drive which includes sprocket wheels 23a secured to the shafts 29 and sprocket wheels 23b driven by the motor 30, through driving connections which are not shown inasmuch as they form no part of the present invention. Shafts 32 and 33 projecting from the front and rear of the machine respectively are secured to the transverse members of the machine frame as shown in Figure 2. Transport wheels 34 shown in chain line in Figure 2 can be mounted on the shafts 32 and 33 for moving the entire machine from one work location to another.

Figures 2, 4, 5 and 6 show the cutting member which is carried by the subgrading machine and which performs the actual work of trimming the subgrade. It is made of a plurality of similar cutting members extending across the space between the supports 20. Each cutting member has a blade 35 which is generally in the shape of a rectangle having opposed corners beveled so as to form two cutting edges. The blades are therefore reversible. Bolts 36 hold the blades to scoop plates 37 which extend rearwardly and upwardly from the point where the blades engage the subgrade. The scoop plates 37 are reinforced by plates 38 extending vertically and normal to the rear of the plates 37 to which they are welded. The scoop plates 37 are further reinforced by horizontal bars 39 also welded at their forward end to the rear of the scoop plates 37 and curving inwardly at 40 to join the vertical plates 38. Horizontal reinforcing plates 41 are welded to the top of the reinforcing bars 39. Angles 42 welded to the top surfaces of the plates 41 and to the rear of the scoop plates 37, together with the vertical plates 38, carry bolts 43 by which the forward end of the cutting member is supported as will be hereinafter described.

Each unit of the cutting member has an oscillator designated generally by the reference numeral 44 which is generally similar to the oscillator described in my patent except that it is mounted in a vertical rather than a horizontal plane. A housing 45 for each oscillator is bolted to a backing plate 45a, which in turn is welded to the vertical plates 38 and the horizontal plates 41. The housing 45 has horizontal and vertical webs 46 and 47 respectively extending rearwardly from each side of the housing. These webs engage bolts 48 which in turn are used to support the rear end of the cutting member as will be hereinafter described.

Each unit of the cutting member is individually supported from the forward ends of two T-beams 49, the rear ends of which pivot on rubber bushings and pins in yokes 50 carried by angles 51 suspended from the rear transverse member 19. Vertically extending compound leaf springs 52 and 53 are bolted at their upper ends to angles 54 carried by the T-beams 49. The lower end of the leaf spring 52 includes an eye-shaped loop embracing a rubber bushing 43a and a bolt 43 which passes through the angles 42 and plates 38 at the forward end of a cutting member (see Figure 5). The lower end of leaf spring 53 similarly embraces a rubber bushing 48a and bolt 48 carrying the webs 46 and 47 of the oscillator housing 45.

Plates 56 extending between the transverse members 15 and 16 support the upper ends of turnbuckles 55 which in turn support the forward ends of the T-beams 49. The turnbuckles connect at each end by means of pins and rubber bushings similar to those above described. The vertical position of the cutting member and its blade 35 can therefore be adjusted by turning the turnbuckle 55. Since the cutting member is composed of several identical units extending across the space between the road forms 20, the contour of the subgrade which is cut by the cutting machine can be regulated by vertical positioning of each of the units.

Figure 5:
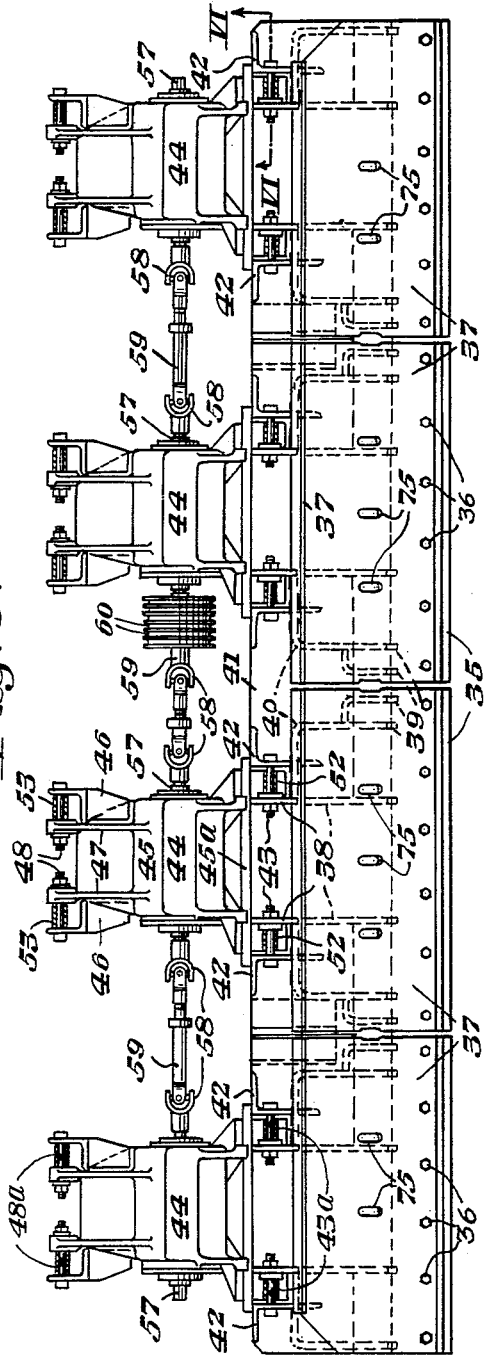
Figure 5 is a plan view of the cutting member.

Figures 2, 4 and 5 show the drive for the oscillators 44. As shown in Figure 5, the drive shafts 57 of the oscillators 44 are connected together by universal joints 58 and short shafts 59. One of the shafts 59 carries a set of V-pulleys 60 for a conventional V-belt drive. The pairs of T-beams 49 which each support one of the units of the cutting member carry a shaft 61 to which are keyed a set of V-pulleys 62 and another set not shown in the drawings. The second set of V-pulleys form a second V-belt drive with V-pulleys 63 (see Figure 3) carried on an axle 64 journaled in angles 65 suspended from the rear transverse member 19. Another set of V-pulleys 66 also keyed to the shaft 64 form part of a third V-belt drive with V-pulleys 66a which are driven by the motor 30 through a suitable drive.

It should be noted that the axle 64 which carries the V-pulleys 63 is journaled in line with the pivot point of the T-beams 49 (see Figures 2 and 3) so that the units of the cutting member can be vertically adjusted without disturbing the tension of the belts in the drive. Further, in the illustrated embodiment, the pivot points of the T-beams 49 are substantially in alignment with the axis of the wheels 23.

As shown in Figures 1 and 2, my subgrading machine has a flight conveyor, the flights 67 of which are spaced along the chain 68 and pass immediately in front of the upper portion of the scoop plate 37 and above the lower portion of the plate and the cutting blade 35. The chain 68 forms a continuous loop around sprocket wheels 69 and 71 journaled on opposite sides of the machine and having parallel upper and lower reaches guided between the flanges 101, 102 and 103, 104. The machine and the conveyor are arranged so that the conveyor can discharge from either side of the machine depending upon which side of the machine a discharge chute 70 is placed. Thus, it will be noted particularly from Figure 1, that the machine has substantially identical sides in the plane of the conveyor flights 67 and chute 70. Thereby, chute 70 with its sprockets 71 can be connected either to the left-hand side of the machine as shown in Figure 1, or dismounted and connected to the right-hand side of the machine, which is to the left in Figure 1. In the latter such location of chute 70, the chain 68 is correspondingly shifted because its flange keepers and sprockets are also symmetrical about the longitudinal center line of the new machine. The chains 68 are driven by terminal sprocket wheels 71 turning on a shaft 72 journaled in the top of the chute 70. A separate chain drive passing over another sprocket wheel journaled on the shaft 72 and one of sprocket wheels 73 supplies power to the sprocket 71. The motor 30 drives the sprocket wheels 73 through clutches 74.

The flights 67 of the conveyor remove material cut from the subgrade by the cutting members which piles up in front of the scoop plates 37. That piling up except for finer material which sifts rearwardly through openings 75 mounts to a height commensurate with the path of travel of the lower reach of flights 67 passing in front of scoop plates 37 as shown in Figure 1. The material is carried across in front of the scoop plate and up the chute 70 to a point of discharge. It should here be noted that as shown in Figures 1 and 5 the scoop plates 37 have slots 75 formed therein and spaced across the scoop plates above the level of the cutting blades. The purpose of these slots is to permit some of the fines from the material cut by the cutting member to pass through the scoop plates and thereby supply material to the strike-off which follows. The conveyor action of the flights in removing excess material in front of scoop plates 37 also assists in bringing renewed opportunity for finer material to reach the openings 75 through which such finer material may pass to the rear of the cutting member. This material is used to provide a loose layer for final rolling to grade and for filling in any depressions which may be left by the cutting member in the subgrade. (For example, the cutting member might dislodge a stone embedded in the subgrade which would leave a hole in the subgrade below the desired level.) The flight conveyor cooperates with the cutting member in passing fines to the rear of the cutting member. As shown in Figure 2, the flights 67 have teeth 67a formed in their outer edges which rake the material cut from the subgrade by the cutting member, and the flights thus break up lumpy materials as well as remove all material not passed through the slots 75. This facilitates the passage of fines to the rear of the cutting member.

My subgrading machine also has a strike-off designated generally by the reference numeral 76 which is pivotally connected to the rear of the main frame of the subgrader as shown in Figure 2. Spacing the strike-off 76 to the rear of the main frame of the subgrading machine permits inspection of the subgrade after it is cut by the cutting member so that any sizeable objects below grade but displaced by the cutting member may be removed; and such spacing further permits observation of the pile of fines scraped up by the strike-off so that the cutting member may be raised or lowered, as the case may be, to vary the grade below the strike-off and correspondingly the rate at which the fines are passed below the strike-off. Such variation of the setting of the cutting member is characteristic of normal operation of my machine with the strike-off as soil conditions vary along different sections of the roadway. Sandy soils, for example, are finer and require a lower setting of the cutting member with respect to the strike-off than certain types of clay, as with such sandy soils more fines pass through the slots 75. The operator, however, observing the pile of fines in front of the strike-off, need not anticipate variations in soil conditions. As he sees this pile increase in size he lowers the cutting member slightly, or if the pile decreases he raises the cutting member accordingly, thus regulating the thickness of the layer of fines struck off at correct grade according to the amount of fines which sift through the holes 75 as the work progresses. This regulation is effected by actuating the hydraulic jacks 28 previously mentioned.

Figures 7, 8 and 9 show the construction of the strike-off 76. My strike-off has a frame 77 which extends between supporting surfaces—in this case the road forms 20. This frame is in the general form of a channel, the web 78 of which extends vertically when the strike-off is in operative position and having a lower flange 79 wider than an upper flange 80. In order to adjust the length of the frame it is made in telescoping sections (see Fig. 7) including two end sections 81 and central section 81a which are held in overlapping engagement by bolts 81b in the upper and lower flanges. The end sections 81 of the frame have longitudinal plates 82 extending between the upper and lower flanges to form box frames in which adjustable axles 83 journaled in wheels 84 adapted to ride on the road forms 20 are mounted. Adjustable posts 85 extend through the top flange 80 of each end section into the box frame and carry collars 86, in which the shafts 83 are secured. Short lengths of channel 87 are welded to the upper surface of the flanges 80 and support plates 88 through which the posts 85 also pass. The posts 85 are threaded and the vertical position of the frame relative to the road forms 20 can be adjusted by turning nuts 89 threaded on the posts and engaging the plates 88.

Scraper blades 90 are bolted to the webs 78 from end to end of the channel 77. The bolts which hold the blades to the webs pass through slots 91 in the webs so that the height of the blades relative to the frames can be adjusted.

Links 92 connect the strike-off to the main frame of the subgrading machine, the links being slotted at one end 93 so that a pin can be passed through a plate on the grading machine which fits into the slotted end. The other end of each of the links 92 carries a yoke 94, the two arms of which embrace a wheel 84 and pivot about the shafts 83.

As indicated above, the frame 77 may rotate about the axis of the wheels 83. It is, therefore, necessary to provide means for keeping the frame in a generally vertical position when the blades 90 are levelling the accumulated fines to desired adjusted grade. Accordingly, angles 95 having one flange welded to the top surface of the yokes 94 carry bolts 96 in their other flange which bolts press against the front face of the webs 78 of the end sections of the frame (see Figure 9). Nuts 97 threaded on the bolts 96 on each side of the flange can be turned to adjust the angle which the blades make with the subgrade and thus provide an additional adjustment for the blades with respect to the subgrade.

A vertically extending plate 98 is welded to the inner end of one of the angles 95 and carries a bolt 99 upon which a hook 100 is pivoted. If it is desired to move the strike-off over the subgrade without the blades 90 engaging the subgrade, the entire frame 77 can be rotated about the axles 83 until the hook can be passed under the bottom edge of a blade 90 as indicated in chain lines in Figure 9. The hook thus holds the blades 90 above the surface of the subgrade.

From the foregoing it is apparent that I have invented a subgrading machine which trims the subgrade by a vibrating cutting member, removes material cut from the subgrade, and at the same time provides fines which can be used for filling up holes and for final levelling off by a strike-off prior to final rolling of the subgrade. The flight conveyor which removes material after it is cut from the subgrade cooperates with the cutting member in supplying fines to the subgrade. A strike-off is provided at a substantial distance to the rear of the cutting member so that the subgrade can be inspected prior to final levelling off of the subgrade. The strike-off in turn is fully adjustable both as to contour and depth and can readily be placed in operative or inoperative position.

The cutting member is readily regulated while in use to change the elevation or grade of the cut with respect to the elevation of the strike-off. By this simple regulation the grade is cut to proper elevation to use all the fines passed through the cutting member to the strike-off and no rehandling of fines, removal of excessive fines, or supply of additional fines at the strike-off is necessary.

The construction of the subframes which support the cutting member from the main frame has been greatly improved over the subframes disclosed in my Patent No. 2,416,401. The depth at which the cutting member cuts the subgrade can be controlled by simply turning two turnbuckles on each subframe. Pivoting the subframes to the main frame at one end makes possible a simple V-belt drive. The leaf spring suspension of the cutting member from the subframe absorbs substantially all of the vibrations imparted to the cutting member so that a minimum of vibration is imparted to the main frame.

While I have described a present preferred embodiment of my invention it is to be understood that it may be otherwise embodied within the scope of the following claims.

I claim:

1. In a subgrading machine, in combination, a wheeled frame, a cutting member suspended from said frame, a support for the cutting member comprising at least one beam extending transversely to the cutting member, said beam having one end pivoted to said frame, means for suspending the cutting member from said beam away from said pivot, an oscillator suspended from said frame and connected to said cutting member, means for rotating said oscillator, said last-mentioned means having an axis coinciding with the axis of said pivot, and vertically adjusting means for supporting the end of said beam from said frame.

2. In a subgrading machine, in combination, a wheeled frame, a cutting member, a longitudinally extending beam, said beam being pivoted to said frame, longitudinally flexible parallelogram means for suspending said cutting member from said beam at a distance from said pivot, an oscillator to oscillate in a vertical longitudinal plane suspended from said beam and connected to said cutting member, means for rotating said oscillator having an axis coinciding with the axis of said pivot and a further axis adjacent the upper side of said parallelogram between the sides thereof, and means for supporting said beam at a distance from said pivot from said frame.

3. In a subgrading machine, in combination, a frame, a transversely extending vibratory cutting member suspended from said frame to cut a subgrade to depth, said cutting member having longitudinal openings therethrough for fines, means carried by the frame for adjusting the height of said cutting member, a transversely moving conveyor suspended from the frame on the leading side of said cutting member in proximity thereto to help pass fines through said openings, a transversely extending strike-off member behind said cutting member and in spaced relation thereto, and a draw link connecting said strike-off member to said frame in trailing relation thereto such that an open space for inspection exists between the rear end of said frame and said strike-off member, whereby the amount of said fines passing through said openings may be viewed for control in relation to the leveling thereof by said strike-off member.

4. In a subgrading machine, in combination, a movable frame, a transversely extending cutting member connected to said frame, said cutting member comprising a plurality of side-by-side cutting sections extending generally upwardly and rearwardly from the bottom edges thereof, means on the frame for adjusting the height of said cutting sections, said sections further having longitudinally extending spaced sifting openings therethrough, an endless conveyor connected to said frame, the lower reach of said conveyor sweeping across the forward face of said sections to remove surplus material being graded and provide a constant source of finer material to pass through said openings to the rear of said sections, means supported by said frame for vibrating said sections, and a transverse strike-off member behind said frame and connected thereto in spaced trailing relation to provide an open zone for inspection between the rear of said frame and said strike-off member, whereby the quantity of finer material passing through said openings may be viewed for control in relation to the leveling thereof by said strike-off member.

References Cited in the file of this patent
UNITED STATES PATENTS

| | | |
|---|---|---|
| 1,736,352 | Mahoney et al. | Nov. 19, 1929 |
| 1,924,572 | Samuel | Aug. 29, 1933 |
| 1,989,431 | Stamm | Jan. 29, 1935 |
| 1,990,362 | Baker | Feb. 5, 1935 |
| 2,062,544 | Weeks | Dec. 1, 1936 |
| 2,134,848 | Anderson | Nov. 1, 1938 |
| 2,136,614 | Harley | Nov. 15, 1938 |
| 2,255,343 | Bailey | Sept. 9, 1941 |
| 2,314,985 | Jackson | Mar. 30, 1943 |
| 2,336,124 | Phoenix | Dec. 7, 1943 |
| 2,387,764 | Maxwell | Oct. 30, 1945 |
| 2,416,401 | Meisenburg | Feb. 25, 1947 |
| 2,417,520 | Porch | Mar. 18, 1947 |
| 2,443,492 | Austin | June 15, 1948 |
| 2,491,208 | Price et al. | Dec. 13, 1949 |